(No Model.)
W. L. HAY & R. L. JOHNSTON.
MOWING MACHINE ATTACHMENT.
No. 518,842. Patented Apr. 24, 1894.
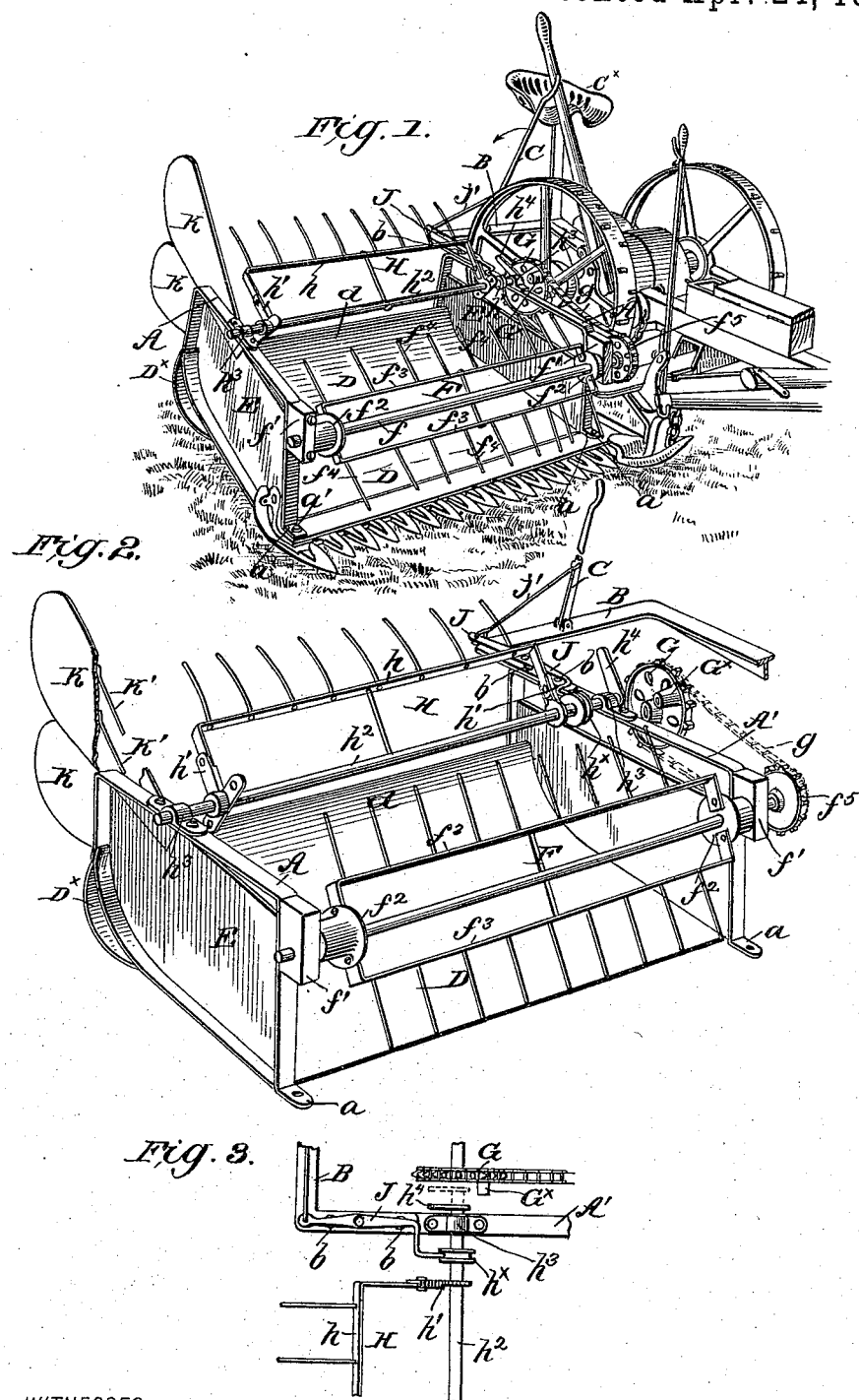
WITNESSES:
Jos. A. Ryan
M. D. Blondel
INVENTORS
William L. Hay
Robert L. Johnston
BY Munn
ATTORNEYS.
THE NATIONAL LITHOGRAPHING COMPANY,
WASHINGTON, D. C.

UNITED STATES PATENT OFFICE.

WILLIAM LAFAYETT HAY AND ROBERT LANCELOT JOHNSTON, OF FRANKLIN, TENNESSEE.

MOWING-MACHINE ATTACHMENT.

SPECIFICATION forming part of Letters Patent No. 518,842, dated April 24, 1894.

Application filed January 19, 1894. Serial No. 497,437. (No model.)

*To all whom it may concern:*

Be it known that we, WILLIAM LAFAYETT HAY and ROBERT LANCELOT JOHNSTON, residing at Franklin, in the county of Williamson and State of Tennessee, have invented certain new and Improved Mowing-Machine Attachments, of which the following is a specification.

Our improved attachments, are adapted to be detachably connected with any of the ordinary mowing machines now in general use, and they are especially designed for the purpose of gathering and piling up seed clover, as it is cut by the mower, and such invention has primarily for its object, to provide attachments of this character, simple in construction, easily manipulated, and very effective for their desired purposes.

With other objects in view, which hereinafter will be referred to, the invention consists in such peculiar combination and novel arrangement of parts, as will be first described in detail, and then pointed out in the appended claims, reference being had to the accompanying drawings, in which—

Figure 1 is a perspective view of our improved attachments, showing the same applied to a mower. Fig. 2 is a similar view of the attachments detached, and Fig. 3 is a detail view of the shifting devices hereinafter referred to.

Our improved attachments comprise a main frame composed of ⎡⎤ shaped end supports A A, the lower ends of which terminate in foot portions $a\,a$ which are bolted to the mower frame by the bolts $a'$, in a manner clearly understood from the drawings, the weight of such frame being in a measure sustained by the main frame of the mower through the medium of a horizontally disposed yoke member B, bolted at its outer end to the mower frame, while its inner end is bolted as at $b$, to the top of the inner supporting member A′, and such member B, extends rearward and forms a bearing member for a shifting lever C, hereinafter more particularly referred to. It will be noticed by reference to Fig. 1, the outer support A, is disposed at the outer end of the sickle frame, while the support A′, is disposed on the inner end of such sickle frame; and extended entirely over such sickle frame, is a bottom plate D, which forms a platform to receive the clover as it is cut by the sickle. This platform D, is secured to the supports A A′, and has its rear end curved upward as at $d$, to form a trough like portion to collect the cut clover, which is held from dropping off sidewise by the end wings or protectors E E.

F indicates a rotary rake, which consists of a shaft $f$, journaled in bearings $f'\,f'$, on the front upper edges of the supports A A′, on which are fixedly held disks $f^2$, to which are secured opposite wing members $f^3$, which extend longitudinally over the sickle bar, and have outwardly extending rake fingers $f^4$, which are adapted as the shaft $f$ is revolved, to pass closely over such sickle bar, to carry the cut clover back into the trough like portion of the platform D. The inner end of the shaft $f$, projects beyond its bearing and has a sprocket wheel $f^5$, which is driven by a chain $g$, in turn, driven by a sprocket wheel G, on the outer end of mower axle.

H indicates a discharging rake, which consists of a yoke like tooth frame $h$, of a length sufficient to extend across the receiving platform D, which frame is fixedly connected with its short arms $h'$, to a rotary shaft $h^2$, journaled in bearings $h^3$, on top of the supports A A′, and at a point approximately in line with the mower axle, its inner end terminating with a crank member $h^4$, which is adapted to be engaged by a stud $G^\times$, projected from the sprocket wheel G.

It will be noticed by reference to the drawings, the front rake has a double set of rake teeth, while the rear rake has but one set, such construction being provided to enable the clover to accumulate in the trough portion of the platform, during each discharging action of the rear rake, whereby such clover will be discharged in a more compact mass. As a further means of allowing the clover to accumulate on the platform, preparatory to its being discharged, I provide shifting devices which will serve to move the crank member of such rake out of the path of the operating stud $G^\times$. For this purpose the shaft $h^2$, is held for a slight longitudinal movement in its bearings, and as a simple means for effecting such movement, the lever C before referred to, is pivoted at its lower end to swing in the direction indicated by the arrow, in Fig. 1, its upper end being extended near the driver's seat $C^\times$ as shown.

J indicates a vibrating rod, pivoted on the inner support A', the front end of which is bent at right angles and held to engage a groove portion $h^\times$, on the shaft $h^2$, while its outer end is connected by a link rod $j'$ with the lever C as shown.

The outer end guide E is provided with rearwardly extending wings K K, which incline inwardly, and which in connection with the inclined rods K', secured on the inner faces of such wings K, serve to deflect the clover hay in the rear of the machine, and out of the path of the horse, and machine on the next round.

From the foregoing taken in connection with the drawings, it is thought the complete operation of our invention will be readily understood. By providing an attachment constructed as described and shown, the clover can be cut and delivered much cheaper than by means of a common mower and rake.

The outer end of platform D in practice is preferably supported on a steel shoe $D^\times$ as clearly shown in the drawings.

Having thus described our invention, what we claim, and desire to secure by Letters Patent, is—

1. An improved clover gathering attachment for mowing machines, comprising side supports adapted to be detachably secured on the sickle portion of the mower frame, a receiving platform supported on such frame, a revolving rake at the front of such frame, a revolving discharging rake journaled over the rear end thereof, having a crank arm at one end, the lower rake shaft having a sprocket gear at one end, a drive chain, and an independent sprocket wheel having a lateral stud, said wheel adapted to be fitted on the mower axle, and to engage the crank member on the upper rake shaft, when fitted on the mower axle to rotate therewith, all substantially as shown and for the purposes described.

2. The combination with a mower, having a drive wheel on its axle provided with a projecting stud, of supporting members held over the sickle frame, having a receiving platform, a revolving gathering rake journaled on such supports to operate over the sickle bar, and provided at one end with a drive wheel, a discharging rake mounted over the rear portion of the receiving platform, having a crank arm at one end projected in the path of the stud on the mower axle drive wheel, and connections between such wheel and the lower rake shaft drive wheel, all arranged substantially as shown and described.

3. In combination with a mower, and a drive wheel mounted on its axle, and provided with a projecting stud, of supports secured on the outer and inner ends of the sickle frame, a rearwardly extending receiving platform held thereby, a revolving rake, journaled transversely on the front of such supports and having a drive wheel at one end, and a pair of oppositely extending rake heads or members, a revolving discharging rake journaled over the rear portion of the platform, having a single rake head or member, its shaft having a crank arm at one end, adapted to be engaged by the stud on the axle drive wheel, and the connection between such wheel and the front rake operating wheel, all arranged substantially as shown and for the purposes described.

4. A clover gathering attachment for mowers, comprising a frame adapted to be detachably secured on the sickle bar, provided with a receiving platform, a revolving gathering rake journaled transversely over the sickle bar, a revolving discharging rake journaled over the receiving platform, its shaft having a crank arm at one end, a drive wheel having a lateral stud adapted to be fitted on the mower axle and to engage the aforesaid crank arm with its stud member, when fitted on such axle, and a lever mechanism connected with such discharging rake, adapted to shift such rake to move its arm in or out of engagement with such stud wheel, all arranged substantially as shown and described.

5. In attachments for mowers, the combination with the main and sickle frame portions of the mower, of the supports A A', secured at their front end to the sickle frame section, the platform D and end guides E secured thereto, the outer guides having rear extensions or wings K K, the gathering rake F, and discharging rake H, journaled respectively at the front and near the rear of the supports, the rake F having a drive wheel, the rake H having a crank arm and held for longitudinal movement in its bearings, the drive wheel G mounted on the axle, having a stud member adapted to engage the said crank arm, the chain connection between such wheel G, and the lower rake drive wheel, the yoke frame B, the lever C and the vibrating rod or lever J, connected with the upper rake shaft and the lever C, all arranged substantially as shown and described.

WILLIAM LAFAYETT HAY.
ROBERT LANCELOT JOHNSTON.

Witnesses:
JAS. P. HARMER,
NEWT. C. PERKINS.